I. ZION.
EDUCATIONAL DEVICE.
APPLICATION FILED MAY 26, 1919.
1,346,929.
Patented July 20, 1920.
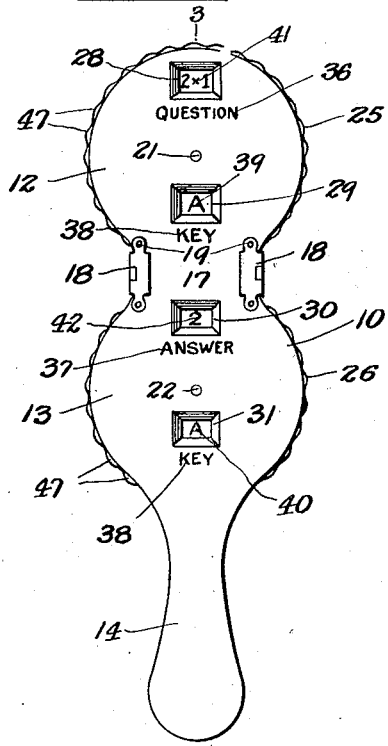
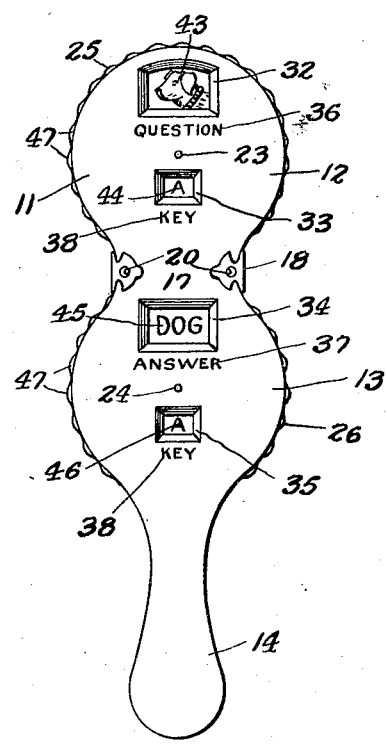
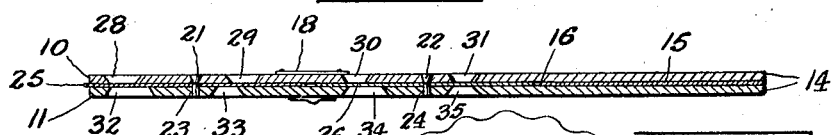
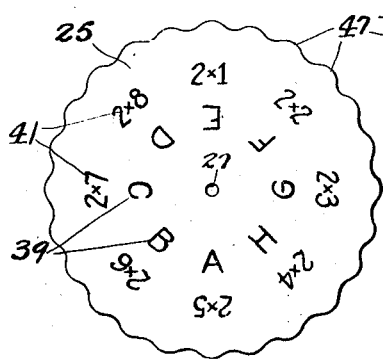
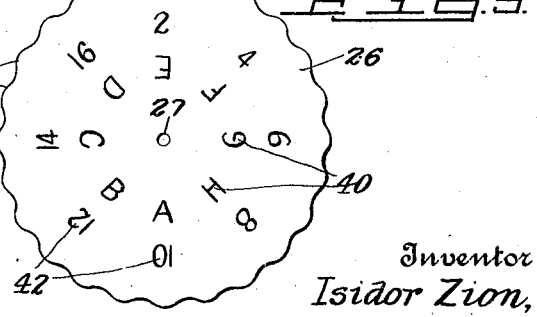
Inventor
Isidor Zion,
By his Attorneys

UNITED STATES PATENT OFFICE.

ISIDOR ZION, OF RIDGEFIELD, NEW JERSEY.

EDUCATIONAL DEVICE.

1,346,929.  Specification of Letters Patent.  Patented July 20, 1920.

Application filed May 26, 1919. Serial No. 299,913.

*To all whom it may concern:*

Be it known that I, ISIDOR ZION, a citizen of the United States, and residing at Ridgefield, in the county of Bergen and State of New Jersey, have invented certain new and useful Improvements in Educational Devices, of which the following is a specification, such as will enable those skilled in the art to which it appertains to make and use the same.

This invention relates to educational devices designed for use particularly by children, and the object of the invention is to provide a device of the class specified which may be used for giving and solving mathematical problems, and which may also be used for illustrating pictures, signs, characters and the like and for giving the names of such pictures, signs, characters and the like; and with this and other objects in view the invention consists in a device of the class specified which is simple in construction and operation and practical in use.

The invention is fully disclosed in the following specification, of which the accompanying drawing forms a part, in which the separate parts of my improvement are designated by suitable reference characters in each of the views, and in which:—

Figure 1 is a plan view of one side of my improved educational device;

Fig. 2 a plan view of the opposite side of the device;

Fig. 3 a central longitudinal section through the device on the line 3—3 of Fig. 1;

Fig. 4 a plan view of one of a number of question data disks or dials which I employ; and, Fig. 5 a plan view of one of a number of answer data disks or dials which I employ.

In Figs. 1 to 3 inclusive, I have shown my improved educational device complete with two data disks or dials therein, and in position for use, and said device consists of similarly formed plates 10 and 11, each of which comprises two approximately circular head portions 12 and 13 and the head portions 13 of each of the plates 10 and 11 are provided with handle members 14.

Secured to the inner face of one of the handle members 14 is a spacing strip 15 which is of the same general form as the handle members 14 and extends inwardly to the point 16, as clearly shown in Fig. 3.

The adjoining parts 17 of the head portions 12 and 13 are provided on opposite sides with hinged clasp members 18, which are secured to the plate 10 as shown at 19 and which are detachably connected with pins or headed members on the other plate 11 as shown at 20.

Secured centrally to the head portions 12 and 13 of the plate 10 are pins 21 and 22 which extend inwardly, and which are adapted to pass through apertures 23 and 24 centrally of the head portions 12—13 of the plate 11, and these pins serve to keep the separate plates 10 and 11 in alinement, and also serve as fulcrums for a plurality of data disks which I employ.

In Fig. 4 of the drawing I have shown at 25 a question data disk or dial and in Fig. 5 I have shown at 26 an answer data disk or dial, and each of these disks or dials are provided with central apertures 27 through which the pins 21 and 22 are adapted to pass. The disk or dial 25 is adapted to be mounted between the head portions 12 of the plates 10 and 11, while the disk or dial 26 is adapted to be mounted between the head portions 13 of the plates 10 and 11, as clearly illustrated in Figs. 1 to 3 inclusive.

The head portion 12 of the plate 10 is provided adjacent to the top thereof with an aperture or opening 28, and adjacent to the bottom thereof with another aperture 29, while the head portion 13 of the plate 10 is provided at the top portion thereof with an aperture 30 and at the bottom portion thereof with an aperture 31.

The head portion 12 of the plate 11 is provided adjacent to the top thereof with an aperture 32 and adjacent to the bottom thereof with an aperture 33, while the head portion 13 of said plate is provided adjacent to the top thereof with an aperture 34 and adjacent to the bottom thereof with an aperture 35. It will be noted that the apertures 28 and 30 on the plate 10 and apertures 32 and 34 on the plate 11 are at a greater distance from the pins 21 and 22 in the plate 10, which serves as the fulcrum for the disks or dials 25 and 26, than the apertures 29—30 and 33—35. The apertures 28 and 32 are preferably designated by the words "Question" as shown at 36, while the apertures 30 and 34 are designated by the words "Answer" as shown at 37, and the apertures 29, 31, 33 and 35 are each designated by the word "Key" as shown at 38.

The disk or dial 25 is provided with circumferentially arranged reference characters as shown at 39, said reference characters being the letters of the alphabet and read from A to H inclusive, and the disk or dial 26 is provided with similarly arranged characters 40, which also read from A to H inclusive, and these characters are adapted to register with the apertures 29 and 31 in the head portions 12 and 13 of the plate 10 as illustrated in Fig. 1 of the drawing.

The disk or dial 25 is provided outwardly of the circumferentially arranged characters with similarly arranged numerals as shown at 41, and these numerals are arranged in pairs and are in the form of mathematical problems as shown, the first of said pair of numerals, or the first problem being "2×1," while the last is "2×8," and these numerals or pairs of numerals are adapted to register with the aperture 28 in the head portion 12 of the plate 10.

The disk or dial 26 is also provided with circumferentially arranged numerals 42, the first of which is the numeral 2 and the last of which is 16, and these numerals are adapted to register with the aperture 30 in the head portion 13 of the plate 10.

It will be apparent that I have shown in Figs. 4 and 5 but one side of each of the disks or dials 25 and 26, but it will be understood that the opposite sides of said disks or dials may be provided with other subject-matter, such as pictures, characters, prints or the like, and in Fig. 2 of the drawing I have illustrated at 43 one picture, and at 44 the key reference character therefor on the back of the disk or dial 25, said picture and reference character appearing in the apertures 32 and 33 respectively, while on the back of the disk or dial 26 I have shown at 45 the title or name of the picture, or the object in the picture 43, and the key reference character at 46 for the title 45. The title 45 and reference character 46 appear in the apertures 34 and 35 respectively.

From the foregoing description the operation of my improved device will be readily understood when taken in connection with the accompanying drawing and the following statement. It will be noted that with the device, or separate parts or plates of the device which form the holder for the disks or dials 25—26, I may employ any number of such disks or dials, the same being arranged in pairs, as shown in Figs. 4 and 5 of the drawing. The disks 25 are known as the "question" disks, while the disks 26 will be known as the "answer" disks, and in using the device, viewing the same from the plate side shown in Fig. 1 with the disks or dials 25 and 26 in position as shown, the operator first rotates the disk 25 to bring a problem or question in registration with the aperture 28, which operation will also bring a key reference character 39 on said disk in registration with the aperture 29, and in order to find the answer to the question or problem appearing in the aperture 32, the disk or dial 26 is rotated to bring the corresponding key reference character 40 on said disk in registration with the aperture 38 thus bringing the desired answer to the question or problem above referred to in registration with the aperture 30, and a result of one complete operation, as above set out, is illustrated in Fig. 1 of the drawing as is also the result of a similar operation when viewing the device from the other plate side as shown in Fig. 2.

The periphery of the disks or dials 25 and 26 are each provided with a plurality of projections 47 which extend beyond the periphery of the head portions 12 and 13 on the plates 10 and 11, and these projections serve to facilitate the manipulation of said disks within said head portions. It will be understood that while I have shown a specific form of educational device and one method of its use, my invention is not necessarily so limited, and changes in and modifications of the device herein shown and described may be made, within the scope of the appended claims, without departing from the spirit of my invention or sacrificing its advantages.

Having fully described my invention, what I claim as new and desire to secure by Letters Patent, is:—

1. An educational device of the class described comprising a suitable holder, and a pair of disks or dials movably mounted in said holder on independent supports, one of said disks or dials being provided with question data and the other with answer data.

2. An educational device of the class described comprising a suitable holder, a pair of disks or dials rotatably mounted in said holder on independent supports, one of said disks or dials being provided with question data and the other with answer data, and means on each of said disks or dials for designating said data.

3. An educational device of the class described comprising a holder composed of two approximately similar parts, means for detachably connecting the separate parts of the holder, a plurality of disks or dials rotatably mounted between the separate parts of the holder, said disks or dials being provided one with question data and the other with answer data, apertures formed in the separate parts of the holder in connection with which the data on said disks or dials is adapted to register, designating characters on each of said disks or dials for designating the separate data thereon and other apertures formed in the separate parts of the holder in connection with which said designating characters are adapted to register.

4. An educational device of the class described comprising a holder consisting of two plates, each of said plates being provided with two approximately circular portions, handle members adjoining one of the circular portions, pins connected centrally of the circular portions of one plate and adapted to pass through apertures in the other plate for holding said plates in alinement, catch devices for detachably connecting said plate members, and data disks or dials rotatably mounted on said pins between said plate members.

5. An educational device of the class described comprising a holder consisting of two plates, each of said plates being provided with two approximately circular portions, handle members adjoining one of the circular portions, pins connected centrally of the circular portions of one plate and adapted to pass through apertures in the other plate for holding said plates in alinement, catch devices for detachably connecting said plate members, data disks or dials rotatably mounted on said pins between said plate members, and the periphery of said disks or dials being provided with a plurality of projections which are adapted to extend beyond the circular portions of the separate plates of the holder.

6. An educational device of the class described comprising a holder consisting of two plates, each of said plates being provided with two approximately circular portions, handle members adjoining one of the circular portions, pins connected centrally of the circular portions of one plate and adapted to pass through apertures in the other plate for holding said plates in alinement, catch devices for detachably connecting said plate members, data disks or dials rotatably mounted on said pins between said plate members, the periphery of said disks or dials being provided with a plurality of projections which are adapted to extend beyond the circular portions of the separate plates of the holder, and the circular portions of each of the plate members being provided with a plurality of apertures in connection with which the data on the opposite faces of said disks or dials is adapted to register.

7. In an educational device of the class described, a holder comprising two approximately similarly formed plates, devices connected with one of said plates and adapted to pass through the other thereof for holding said plates in alinement, means for detachably connecting said plates, a plurality of apertures formed in each of said plates, a question data disk adapted to be rotatably mounted on one of said devices and an answer data disk adapted to be rotatably mounted on the other of said devices.

8. An educational device of the class described, comprising a holder composed of two approximately similar parts, means for detachably connecting the separate parts of the holder, a plurality of disks or dials rotatably mounted between the separate parts of the holder, said disks or dials being provided one with question data and the other with answer data, a plurality of apertures formed in the separate parts of the holder in connection with a number of which the data on said disks or dials is adapted to register, and means on each of said disks or dials for designating the separate data thereon, said means operating in connection with the other of said apertures.

9. An educational device of the class described comprising a holder composed of front and back plates of approximately similar form, devices on one of said plates adapted to pass through the other for holding said plates in alinement, and disks or dials independently and rotatably mounted on said devices between said plates and provided one with question data and the other with answer data, and said plates being provided with apertures in connection with which the data on said disks or dials is adapted to register.

In testimony that I claim the foregoing as my invention I have signed my name in presence of the subscribing witnesses this 23rd day of May, 1919.

ISIDOR ZION.

Witnesses:
C. E. MULREANY,
H. E. THOMPSON.